US007873745B2

(12) United States Patent
Anna et al.

(10) Patent No.: US 7,873,745 B2
(45) Date of Patent: *Jan. 18, 2011

(54) MESSAGE RECEIPT VERSION MANAGEMENT IN NETWORK

(75) Inventors: Gary Anna, Tucson, AZ (US); Joseph Whitney Dain, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 246 days.

This patent is subject to a terminal disclaimer.

(21) Appl. No.: 12/112,791

(22) Filed: Apr. 30, 2008

(65) Prior Publication Data

US 2009/0276481 A1 Nov. 5, 2009

(51) Int. Cl.
*G06F 15/16* (2006.01)
(52) U.S. Cl. .................................. 709/246; 717/122
(58) Field of Classification Search ................. 709/246, 709/236; 717/170, 122; 715/229; 711/163; 382/128, 175; 358/1.15; 370/351; 345/173
See application file for complete search history.

(56) References Cited

U.S. PATENT DOCUMENTS

| 6,549,949 | B1 * | 4/2003 | Bowman-Amuah | 709/236 |
|---|---|---|---|---|
| 7,310,696 | B1 | 12/2007 | Haechten et al. | |
| 2003/0101283 | A1 | 5/2003 | Lewis et al. | |
| 2003/0123419 | A1 | 7/2003 | Rangnekar et al. | |
| 2003/0149970 | A1 * | 8/2003 | Shanbhogue et al. | 717/170 |
| 2005/0131985 | A1 | 6/2005 | McElhannon | |
| 2005/0172033 | A1 * | 8/2005 | Mathew et al. | 709/246 |
| 2005/0188104 | A1 | 8/2005 | Tan et al. | |
| 2005/0267738 | A1 | 12/2005 | Wilkinson et al. | |
| 2007/0116358 | A1 * | 5/2007 | Klotz et al. | 382/175 |
| 2007/0294496 | A1 * | 12/2007 | Goss et al. | 711/163 |
| 2008/0126386 | A1 * | 5/2008 | Gaurav et al. | 707/102 |
| 2008/0174570 | A1 * | 7/2008 | Jobs et al. | 345/173 |
| 2009/0028403 | A1 * | 1/2009 | Bar-Aviv et al. | 382/128 |
| 2009/0030952 | A1 | 1/2009 | Donahue et al. | |
| 2009/0080408 | A1 * | 3/2009 | Natoli et al. | 370/351 |
| 2009/0190159 | A1 * | 7/2009 | Toscano et al. | 358/1.15 |

* cited by examiner

*Primary Examiner*—Le Luu
(74) *Attorney, Agent, or Firm*—Griffiths & Seaton PLLC

(57) ABSTRACT

A method, apparatus, and computer program product for message receipt version management in a distributed computing environment including a plurality of nodes is provided. At least one translation vector is received in at least one additional node of the plurality of nodes from a first node. The translation vector provides information for the at least one additional node to translate between multiple message versions. A message is translated between versions according to the at least one translation vector. The translated message is forwarded to an application program. In one embodiment, the at least one translation vector is stored for future use.

20 Claims, 10 Drawing Sheets

NODE 0

| NODE | SUPPORTED VERSIONS | 1ST TIME SEND | TRANSLATION VECTOR |
|---|---|---|---|
| 1 | V1 | TRUE | V3 -> V1 |
| 2 | V1-V2 | TRUE | V3 -> V2 |
| 3 | V1-V3 | TRUE | NULL |

NODE 0 TRANSMIT TABLE

FIG.3

NODE 0

| NODE | SUPPORTED VERSIONS | 1ST TIME SEND | TRANSLATION VECTOR |
|---|---|---|---|
| 1 | V1 | FALSE | V3 -> V1 |
| 2 | V1-V2 | FALSE | V3 -> V2 |
| 3 | V1-V3 | FALSE | NULL |

NODE 0 TRANSMIT TABLE

FIG.4

NODE 1

| NODE | SUPPORTED VERSIONS | 1ST TIME RECEIVE | TRANSLATION VECTOR |
|---|---|---|---|
| 0 | V1-V3 | FALSE | V3 -> V1 |
| 2 | V1-V2 | TRUE | NULL |
| 3 | V1-V3 | TRUE | NULL |

NODE 1 RECEIVE TABLE

FIG.5

NODE 2

| NODE 2 RECEIVE TABLE | | | |
|---|---|---|---|
| NODE | SUPPORTED VERSIONS | 1ST TIME RECEIVE | TRANSLATION VECTOR |
| 0 | V1-V3 | FALSE | V3 -> V2 |
| 1 | V1 | TRUE | NULL |
| 3 | V1-V3 | TRUE | NULL |

NODE 3

| NODE 3 RECEIVE TABLE | | | |
|---|---|---|---|
| NODE | SUPPORTED VERSIONS | 1ST TIME RECEIVE | TRANSLATION VECTOR |
| 0 | V1-V3 | FALSE | NULL |
| 1 | V1 | TRUE | NULL |
| 2 | V1-V2 | TRUE | NULL |

FIG.6

NODE 0

NODE 0 RECEIVE TABLE

| NODE | SUPPORTED VERSIONS | 1ST TIME RECEIVE | TRANSLATION VECTOR |
|---|---|---|---|
| 1 | V1 | FALSE | V1 -> V3 |
| 2 | V1-V2 | FALSE | V2 -> V3 |
| 3 | V1-V3 | FALSE | NULL |

NODE 1

NODE 1 RECEIVE TABLE

| NODE | SUPPORTED VERSIONS | 1ST TIME RECEIVE | TRANSLATION VECTOR |
|---|---|---|---|
| 0 | V1-V3 | FALSE | V3 -> V1 |
| 2 | V1-V2 | FALSE | V2 -> V1 |
| 3 | V1-V3 | FALSE | V3 -> V1 |

NODE 2

NODE 2 RECEIVE TABLE

| NODE | SUPPORTED VERSIONS | 1ST TIME RECEIVE | TRANSLATION VECTOR |
|---|---|---|---|
| 0 | V1-V3 | FALSE | V3 -> V2 |
| 1 | V1 | FALSE | V1 -> V2 |
| 3 | V1-V3 | FALSE | V3 -> V2 |

NODE 3

NODE 3 RECEIVE TABLE

| NODE | SUPPORTED VERSIONS | 1ST TIME RECEIVE | TRANSLATION VECTOR |
|---|---|---|---|
| 0 | V1-V3 | FALSE | NULL |
| 1 | V1 | FALSE | V1 -> V3 |
| 2 | V1-V2 | FALSE | V2 -> V3 |

FIG.7

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VERSION 3 MSG | X | X | X | X | Y | Y | Z | Z | Z | Z | Z | W | W | W | W | W |
| VERSION 2 MSG | X | X | X | X | Z | Z | Z | Z | Z | W | W | W | W | | | |
| VERSION 1 MSG | X | X | X | Z | Z | Z | Z | | | | | | | | | |

V3-V1 TRANSLATION VECTOR

| BYTE OFFSET | LENGTH | NEW BYTE OFFSET | NEW LENGTH |
|---|---|---|---|
| 1 | 3 | 0 | 3 |
| 6 | 4 | 3 | 4 |

V3-V2 TRANSLATION VECTOR

| BYTE OFFSET | LENGTH | NEW BYTE OFFSET | NEW LENGTH |
|---|---|---|---|
| 0 | 4 | 0 | 4 |
| 6 | 5 | 4 | 5 |
| 11 | 5 | 9 | 5 |

80

MESSAGE RECEIPT VERSION MANAGEMENT IN NETWORK

CROSS-REFERENCE TO RELATED APPLICATIONS

This application is related to U.S. Non-Provisional application Ser. No. 12/112,737, filed concurrently herewith and incorporated herein by reference.

BACKGROUND OF THE INVENTION

1. Field of the Invention

The present invention relates in general to computers, and more particularly to apparatus, method and computer program product embodiments for message receipt version management in a network including a number of nodes.

2. Description of the Related Art

Applications in nodes in a network may communicate using a message program that supports predefined messages. The different nodes in the network may have different message version numbers for the messages. To ensure that nodes communicating in a quorum or domain maintain at least one common message version number, the existing nodes in the quorum may govern the ability of a node attempting to join the quorum by preventing a node from joining that does not support a message version supported by the current nodes in the quorum.

A node seeking to join a quorum may initiate a version negotiation algorithm by sending a version request message to all nodes in the quorum/domain. The version request message contains the minimum and maximum supported versions for each and every predefined supported message. The nodes already in the quorum receiving the join request process the content of the request message to determine the highest supported version for each message. As a version is negotiated for a group of messages, the receiving node stores the negotiated version in volatile memory. After updating the negotiated version for each supported message order in volatile memory, the receiving node sends a response message to the node seeking to join that they may join and communicate in the quorum/domain.

Further, even though nodes may support different message versions, a node system may only support sending one version of a message to all nodes in the domain even if some of the nodes support different versions and the negotiated order is dependent upon which nodes enter the domain.

Yet further, certain messaging systems may rely on a centralized server and database to manage different versions of messages. There is a need in the art for an improved technique for managing message versions in nodes in a network.

SUMMARY OF THE INVENTION

Apparatus, method, and computer program product embodiments for message receipt version management in a distributed computing environment including a plurality of nodes are provided. In one embodiment, by way of example only, a method for message version management in a distributed computing environment including a plurality of nodes is provided. At least one translation vector is received in at least one additional node of the plurality of nodes from a first node. The translation vector provides information for the at least one translation vector to translate between multiple message versions. A message is translated between versions according to the at least one translation vector. The translated message is forwarded to an application program.

In another embodiment, by way of example only, an administrator device for message version management in a distributed computing environment including a plurality of nodes is provided. A message module is operable on a receiving application in communication with the plurality of nodes. The message module is adapted for receiving at least one translation vector in at least one additional node of the plurality of nodes from a first node, the at least one translation vector providing information for the at least one additional node to translate between multiple message versions. The message module is further adapted for translating a message between versions according to the at least one translation vector, and forwarding the translated message to an application program.

In still another embodiment, a computer program product for message version management in a distributed computing environment including a plurality of nodes is provided. The computer program product comprises a computer-readable storage medium having computer-readable program code portions stored therein. The computer-readable program code portions comprise a first executable portion for receiving at least one translation vector in at least one additional node of the plurality of nodes from a first node, the at least one translation vector providing information for the at least one translation vector to translate between multiple message versions, a second executable portion for translating a message between versions according to the at least one translation vector, and a third executable portion for forwarding the translated messages to an application program.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 illustrates an exemplary transmit table of the sending node;

FIG. 4 illustrates an exemplary updated transmit table of the sending node;

FIG. 5 illustrates an exemplary updated receive table of a receiving node;

FIG. 6 illustrates additional exemplary updated receive tables of additional receiving nodes;

FIG. 7 illustrates additional exemplary receive tables subsequent to the sending and receipt of a packet;

FIG. 8 illustrates three exemplary messages;

FIG. 9 illustrates a first exemplary translation vector;

DETAILED DESCRIPTION OF THE DRAWINGS

Figure 1:
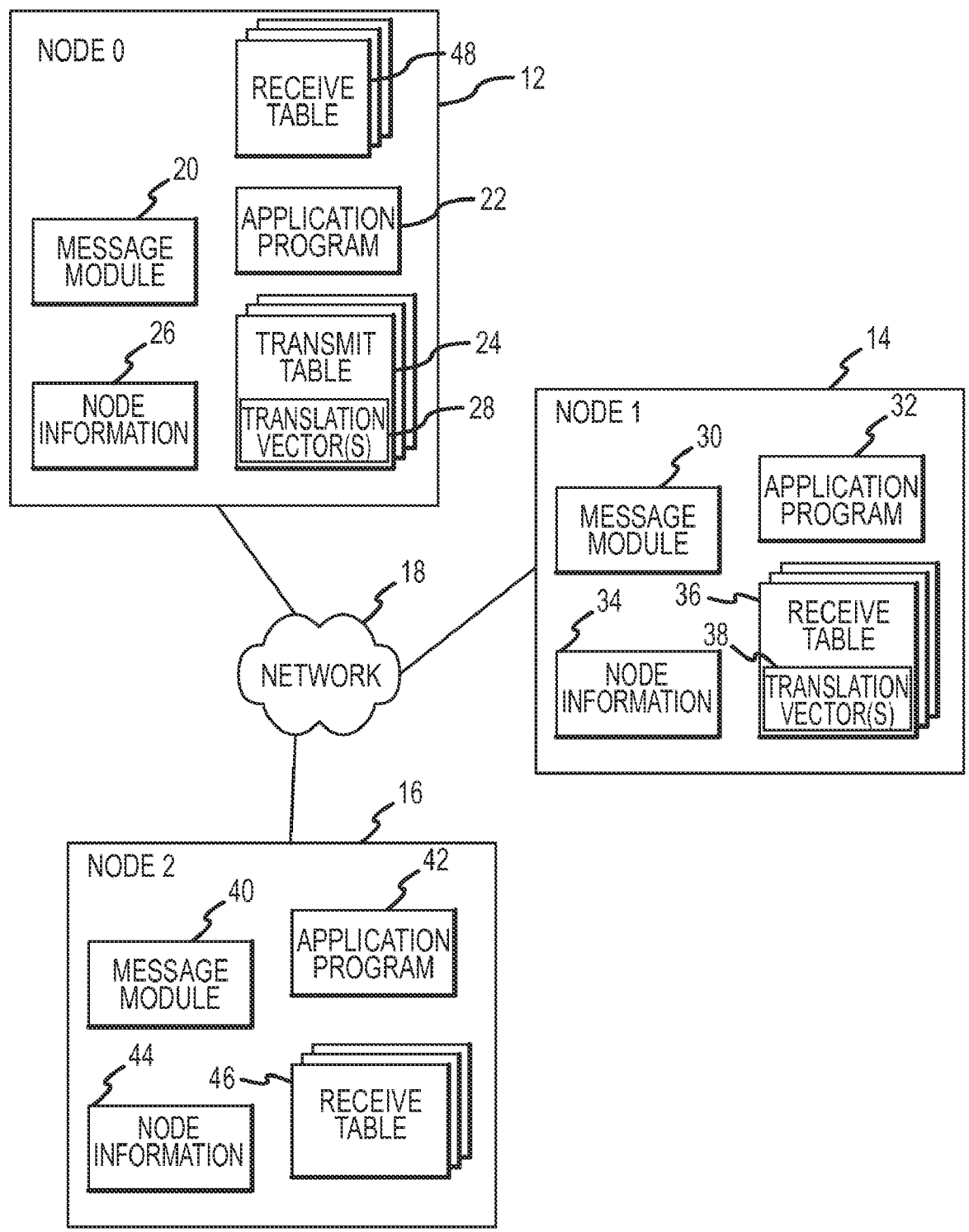
FIG. 1 illustrates an exemplary distributed computing environment including a number of nodes in communication therebetween.

The question of how to efficiently send messages between nodes in a distributed computing environment where each node supports a different message/protocol version poses a challenge for customers and administrators alike. This becomes even more challenging when the communication mechanism among nodes in a distributed computing environment entails multicasting and broadcasting messages to multiple nodes. For example, consider a particular environment including eight nodes, where each node supports a different version of a particular message. Node 0 supports version 1 of a particular message. Node 1 supports versions 1 and 2 of a particular message. Node 2 supports versions 1, 2 and 3 of a particular message. Node 3 supports versions 1, 2, 3, and 4 of a particular message. Node 4 supports versions 1, 2, 3, 4 and 5 of a particular message. Node 5 supports versions 1, 2, 3, 4, 5, and 6 of a particular message. Node 6 supports versions 1, 2, 3, 4, 5, 6, and 7 of a particular message. Each message version is slight different than its predecessor such that a node that understands version 1 of a particular message would not understand versions 2-7. New functionality employed by the customer may require use of a newer message version. It is desirable that customers be able to take advantage of the new functionality when possible, even if all of the nodes in the system do not support the new functionality. As a result, nodes in the system have to provide backward compatibility for previous message/protocol versions. Further, certain functionality may require multicasting or broadcasting messages to all nodes in the system. For example, node 7 may need to broadcast a message to nodes 0-6 using the highest versions supported by all nodes in the system in order to complete a messaging transaction associated with a customer request.

One solution to this problem is to negotiate the highest message/protocol version understood by all nodes in the system. In the configuration above, such a solution would result in a version 1 message negotiated and broadcast to all nodes in the system. This solution is undesirable, however, since none of nodes in the system are unable to take advantage of the higher message version and corresponding functionality.

Another solution may be to send a large message comprising a version 1 message, followed by a version 2 message and so forth, with a header indicating an offset where each message version starts. This solution satisfies the condition where each node receives its highest supported message/protocol version, but considerable overhead is introduced in the process. As an example, if the message to be broadcast is roughly 16 kilobytes (kB), at least 112 kB of network traffic would be necessary (16 kB message*7 nodes) to broadcast the message to all nodes in the system in a configuration described above. Further, applications may send multiple blocks of 16 kB messages (such as when transferring files). In a situation having multiple blocks of messages, considerable communication overhead would be introduced by the use of such a solution.

Another solution may be to group target nodes by common supported message versions and send individual messages to each target group. For example, if nodes 0 and 1 both support a maximum version of 2, node 7 can broadcast a version 2 message to nodes 0 and 1. Similarly, if nodes 2 and 3 both support a maximum version of 3, node 7 can broadcast a version 3 message to nodes 2 and 3. In addition, if nodes 4 and 5 both support a maximum version of 5, node 7 can broadcast a version 5 message to nodes 4 and 5. Lastly, if node 6 supports a maximum version of 7, node 7 can send a version 7 message to node 6. This solution ensures that each node receives the highest supported version, but requires sending multiple messages, that again, introduce additional network traffic on the system.

Still another solution may be to send individual messages to each target node, where each target node receives its highest supported message version. This solution results in again sending multiple message versions and again introduces extra traffic on the system.

Each of the solutions described above fail to provide a method for sending messages to multiple nodes in a distributed computing environment where each node supports different message versions because they are either inefficient and require additional messaging traffic and message processing to function, or they fail to allow nodes in a distributed computing environment to take advantage of new functionality associated with a new message version if all nodes in the system do not support the new message version.

In view of the foregoing, the present invention provides mechanisms for sending messages to multiple nodes where each node supports different message versions, without the requirement of additional overhead. These mechanisms are an efficient way for facilitating communication between multiple applications spanning multiple message versions. The mechanisms track the first time a message is sent between applications. A translation vector accompanies the message from a sending node to a receiving node with the first occurrence of sending the message such that the receiving node obtains the translation vector and uses the vector to translate between message versions. Further the receiving node stores the translation vector for further use.

These mechanisms of the present invention provide a variety of benefits. Network traffic and network resources are minimized. Translation between different versions occurs at a code layer that is transparent to applications. The translation is taught by the mechanisms to remote nodes. It is not required to send multiple versions of messages when communicating between applications. The mechanisms only send the information about message translation on an as needed basis. This further eliminates any unnecessary overhead, as applications are only taught about messages that the applications are currently using. Such a solution may be particularly important in a system that supports a large number of message versions.

The mechanisms according to the present invention are truly distributed. There is no central repository and/or server that translates different message versions between multiple applications. Single points of failure are thereby eliminated. Applications may interact directly with one another, thus eliminating the possibility of a bottleneck at a centralized server. In addition, a mechanism is provided for automatically detecting and correcting message version discrepancies/errors. In the event that the receiving node is unable to translate a received message, the receiving node may request the sending node to send the appropriate translation vector so that the receiving node may properly translate the message. Finally, the mechanisms facilitate the preference of applications to send and receive their highest message version level.

FIG. 1 illustrates an embodiment of a network computing environment 10 in which various aspects of the mechanisms of the present invention may be implemented. A plurality of nodes 12, 14, 16 (and others not shown) communicate over a network 18. Any number of nodes may be connected to network 18. Each node 12, 14, 16 includes a message module 20, 30, and 40 to manage messages sent between application programs 22, 32, and 42. The nodes 12, 14, 16 further include node information 26, 34, 44 providing message version numbers of message versions supported at the nodes 12, 14, 16 and a status of the nodes 12, 14, 16. Each node 12, 14, 16 further includes one or more receive tables 36, 46, 48, on which a translation vector(s) 38 may be stored. Some nodes (e.g., node 16) may not have a stored translation vector depending upon whether a message accompanying such a translation vector has been sent. Node 12 also includes one or more transmit tables 24 including a translation vector(s) 28 are stored. The functionality of such transmit and receive tables will be further described, in the following. The skilled artisan will appreciate that such transmit and receive tables may include similar storage areas, such as arrays, databases, volatile memory, nonvolatile memory, link lists, or any dedicated storage area.

Depending on a particular implementation, each node 12, 14, 16, or otherwise may be adapted to send and/or receive message to/from an additional node. As such, while node 12 is shown with an accompanying transmit table 24, the skilled artisan will appreciate that transmit tables may be incorporated into nodes, 14, 16, or elsewhere on the network 18. Network 18 may comprise a Storage Area Network (SAN), Local Area Network (LAN), Intranet, the Internet, Wide Area Network (WAN), peer-to-peer network, wireless network, arbitrated loop network, etc.

Message modules 20, 30, 40 may track different message versions supported between each application program 22, 32, 42. If an application 22, 32, 42 is sending a message for the first time to another application, the applicable message module 20, 30, 40 on the sending node resolves the versions to be translated. It then constructs a translation vector 28, 38 consisting of the information necessary to translate between multiple message versions and attaches the translation vector to the message to be translated, generating a packet. It then sends the newly constructed packet to the application on the receiving node(s).

Once a packet is received on a receiving node, the message module (e.g., message module 30 node 14) receives the packet and translates the message between versions according to the appropriate translation vector 38. The message module 30 then returns the translated message to the application program 32, and stores the translation vector 38 for future use.

Figure 2:
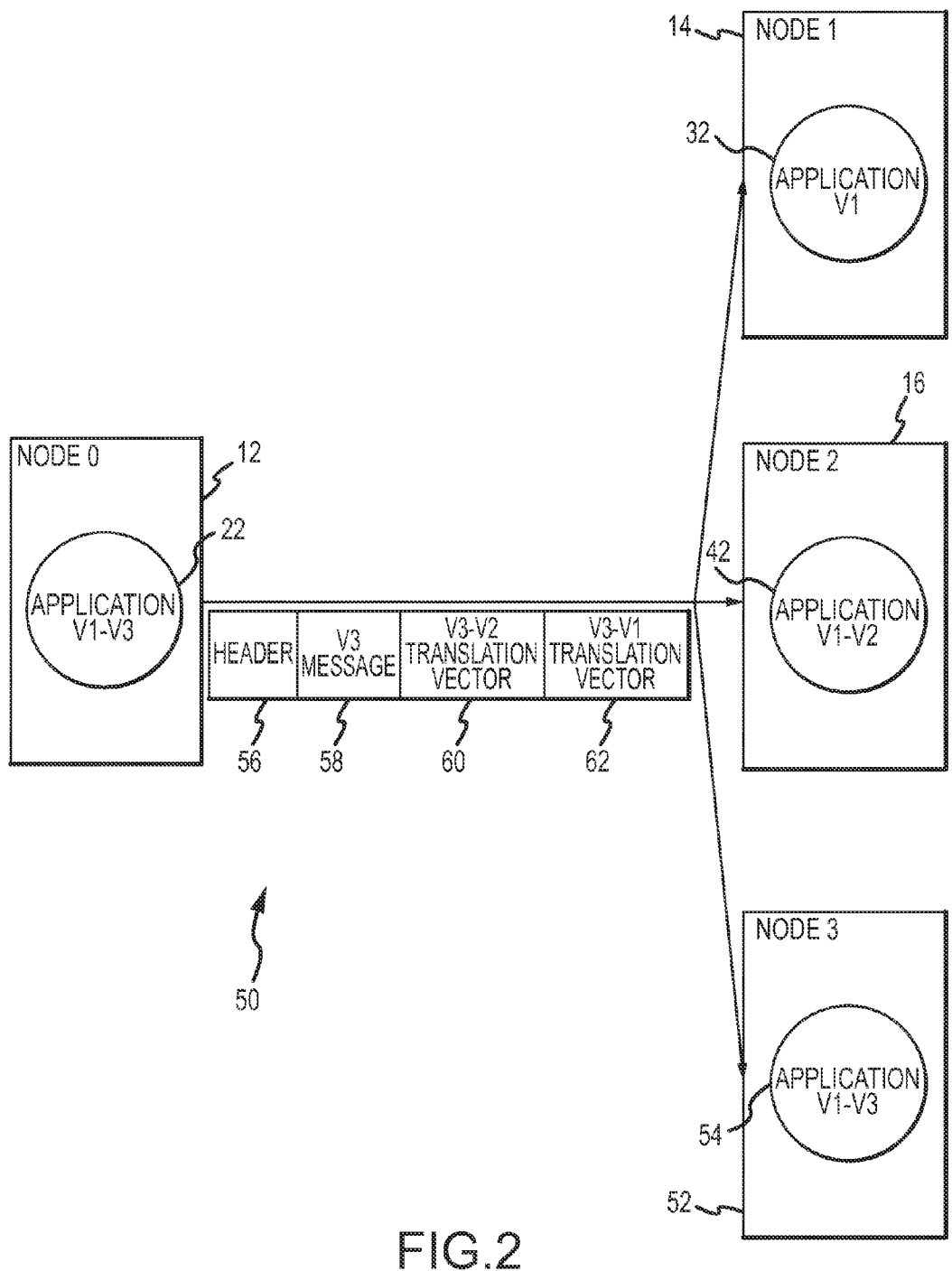
FIG. 2 illustrates an exemplary method of sending a packet including at least one translation vector to at least one receiving node.

FIG. 2 illustrates an exemplary method 50 of sending a packet including at least one translation vector 60, 62 to at least one receiving node 14, 16 and 52. An application 22 operational on node 12 (denoted as node 0) is communicating with applications in three other clusters, nodes 14, 16 and 52 (nodes 1, 2, and 3). Application 22 supports versions 1, 2 and 3 of a particular message (denoted as V1-V3 in FIG. 2). Application 32 supports version 1 of a particular message (denoted as V1 in FIG. 2). Application 42 supports versions 1 and 2 of a particular message (denoted as V1-V2 in FIG. 2). Application 54 supports versions 1, 2, and 3 of a particular message (denoted as V1-V3 in FIG. 2). The first time this message is sent, node 12 will send the message with two translation vectors 60, 62. The first translation vector 60 translates from version 3 to version 2. The second translation vector 62 translates from version 3 to version 1.

When node 14 receives the message, the node 14 will translate the received version 3 message using the version 3 to version 1 translation vector 62. When node 16 receives the message, it will translate the received version 3 message using the version 3 to version 2 translation vector 60. When node 52 receives the message, it will use the version 3 message without a translation vector as it already supports version 3 messages. Node 12 records that the translation vector has been sent to nodes 14, 16, and 52 for this message type. Subsequent messages of this type do not need to include the translation vectors. In an alternate embodiment, the translation vectors could be sent with every message. In yet another alternate embodiment, the translation vector(s) could be sent separate from the message(s).

As shown in FIG. 2, application 22 on node 12 sends a packet including header 56, version 3 message 58, the version 3 to version 2 translation vector 60, and the version 3 to version 1 translation vector 62 to each of the applications 32, 42, and 54 on nodes 14, 16 and 52. The skilled artisan will appreciate that the order and contents of the packet may vary. In addition, when sending a message to only 1 node, only 1 translation vector may be included in the packet that is sent.

Continuing the exemplary method shown in FIG. 1 and FIG. 2, an exemplary process of composing the message to send may be performed as follows. The message module on the sending node (e.g., node 12) consults a transmit table 24 (FIG. 1) in order to determine what, if any, translation needs to be performed when sending a message to the receiving nodes (nodes 14, 16, 52). According to the transmit table 24, the message module 20 determines that the application 32 in node 14 understands version 1, and it will select version 1. Node 16 understands version 1 and version 2, and it will select version 2 for node 16. Node 52 understands versions 1, 2, and 3, and it will select version 3 for node 52.

The message module 20 on node 12 examines transmit table 24 (FIG. 1) for the nodes identified as targets of the message. Node 12 examines transmit table 24 in order to identify whether or not the target nodes have been taught about how to translate from message version 3 to a message version that they support. In this example, according to the information in transmit table 24, the message being sent has not been previously sent to any of the nodes 14, 16, 52, therefore the message module 20 must send the translation vectors 28 for translating the message version 3 to the required versions. In this example, the message would be sent with translation vectors from version 3 to version 2 (60), and from version 3 to version 1 (62).

FIG. 3 illustrates the version table entries 64 in an exemplary transmit table 24 for node 12. The transmit table 24 includes a node field, a supported versions field, a first time send field, and the translation vector message pointer field. For example, for node 1 (node 16, FIG. 2), the supported versions are versions 1, the first time send field is set to true, and the message version translation vector field shows translation from version 3 to version 1. The skilled artisan will appreciate that different methods other than using the first time send field may be employed to track the first time sending of a translation vector.

After successfully sending the message with the attached translation vectors (the packet), the message module 20 (FIG. 1) updates the first time send field to false for the receiving nodes, as illustrated in FIG. 4, which shows updated entries 66 for the sending node 0 (node 12) transmit table 24 (FIG. 1). Upon receiving the packet, node 1 (node 14, FIG. 1) uses the translation vector 62 (FIG. 2) to translate the message from version 3 to version 1. The message module 30 (FIG. 1) then stores the translation vector in its receive table 36 (FIG. 1) for future reference. Additionally, the message module 30 (FIG. 1) updates the value in the first time receive field to false. The skilled artisan will appreciate that different methods other than using a first time receive field may be employed to track the first time receipt of a translation vector.

FIG. 5 illustrates the resultant entries 68 for the receive table 36 for node 1 (node 14). From FIG. 2 when sending from node 0 to node 1 the supported version is denoted to be version 1. Referring back to FIG. 5 the first time receive field in the node 1 receive table 36 is set to false for node 0, and the translation vector message version field shows translation from version 3 to version 1. Entries for nodes 2 and 3 reflect that the node 1 has not received a message from those nodes (the first time receive values remain true), and no translation vector is shown.

In similar fashion to FIG. 5, FIG. 6 illustrates the updated entries 70 in receive tables 46 and 72 for nodes 2 and 3 (nodes 16 and 52, FIG. 2). Note that the translation vector field shows translation from version 3 to version 2 for node 2 from node 0, and no translation, as would be expected, from nodes 1 and 3. If a receiving node receives a message without an appropriate translation vector or the first time receive value is set to true, the receiving node may also request the appropriate translation vector from the sending node. The translation vector can also be obtained from any node that has the appropriate translation vector. FIG. 7 illustrates the resultant entries 74 in the receive tables 48, 36, 46, 72 for each of the nodes once each node has sent a message to each additional node in the system. While the foregoing example shows a mechanism to translate from higher versions to lower versions, the same methodologies may be implemented to translate messages from lower versions to higher versions.

Translation vectors may define how one version of a message is converted into another version. FIG. 8 illustrates three sample messages 76 in various versions. As shown, a version 3 message contains four pieces of data (X, Y, Z, and W). X is 4 bytes long, Y is 2 bytes long, Z is 5 bytes long, and W is 5 bytes long. The same message in version 2 has three pieces of data (X, Z, and W). X is 4 bytes long, Z is 5 bytes long, and W is 5 bytes long. In this example, the Y data is added for version 3. For the same message in version 1, there are two pieces of data (X and Z). X is only 3 bytes long and Z is 4 bytes long.

Using the example messages depicted in FIG. 8, node 1, upon receiving a message that contains version 3 of the message would use the translation vector translation table entry 78 information depicted in FIG. 9 to construct the message in a form that is compatible with a version 1 message. As the entry 78 information shows, the data relationship between differing versions is indicated terms of byte offset and data length. While the relationships shown are utilized in the following translation examples, the skilled artisan will appreciate that other translation schemes or methodologies may be implemented. The translation schemes may include moving bytes a predetermined byte offset, truncating bytes of data, concatenating portions of data, and the like. In the depicted embodiment and translation, the message module takes bytes 1-3 from the version 3 message and move them to bytes 0-2 of the version 1 message. In this example, the data in X is right justified and therefore only uses the rightmost 3 bytes. The message module then takes bytes 6-9 from the version 3 message and moves them to bytes 3-6 of the version 1 message. In this example, the data in Z is left justified and therefore only uses the leftmost 4 bytes. A version 1 compatible message is constructed as shown in FIG. 8.

Figure 10:
FIG. 10 illustrates a second exemplary translation vector.

FIG. 10 shows translation vector translation table entry information 80 for translation from a version 3 message to a version 2 message. In light of the information shown in FIG. 10, node 2, upon receipt of a message that contains version 3 of the message, would use the information 78 to construct the message in a form that is compatible with a version 2 message. The message module would takes bytes 0-3 from the version 3 message and move them to bytes 0-3 of the version 2 message. The module would then take bytes 6-10 from the version 3 message and move them to bytes 4-8 of the version 2 message. The module would then take bytes 11-15 from the version 3 message and move them to bytes 9-13 of the version 2 message. Using the above methodology, a version 2 compatible message is constructed as shown in FIG. 8. As illustrated, depending upon the particular methodology employed in the translation vector, the data in a particular message may be moved according to byte offsets, bytes may be truncated, strings may be concatenated, and the like. The skilled artisan will appreciate that a variety of methodologies may be employed in various translation vectors to provide translation from lower versions to higher versions and vice-versa.

Figure 11:
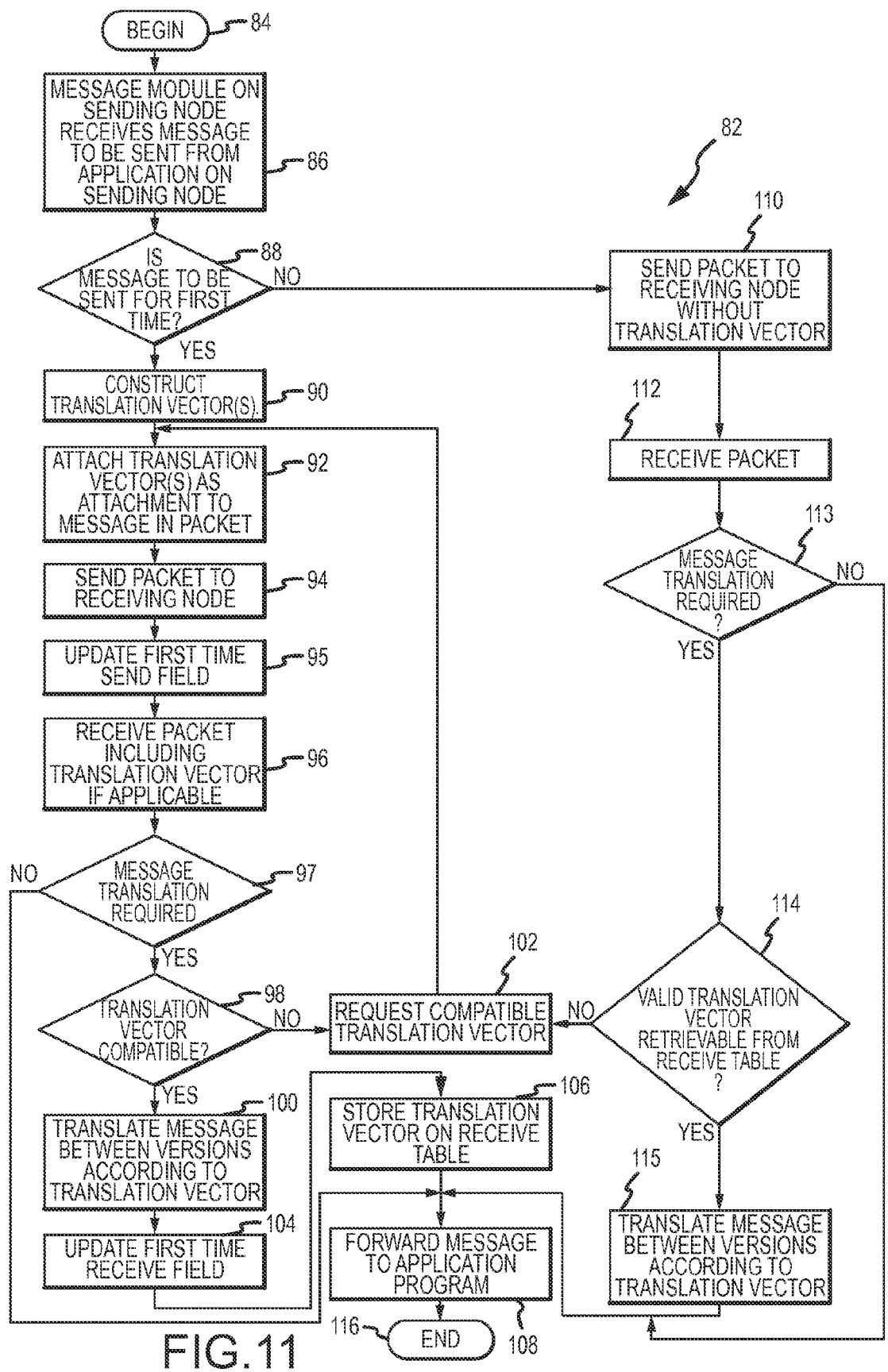
FIG. 11 illustrates an exemplary method for message version management in a distributed computing environment, showing functionality performed at both the sending and receiving end.

Turning to FIG. 11, an exemplary method 82 is depicted for message version management in a distributed computing environment. As one skilled in the art will appreciate, various steps in the method 82 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 82 begins (step 84) with the receipt of a message to be sent from a sending node (step 86) by message module 20 (FIG. 1). Method 82 queries whether the message is to be sent for the first time (step 88). If so, the applicable translation vector (or, if the message is to be sent to more than one receiving node, translation vectors) is constructed (step 90). As has been previously described in the examples above, the message module 20 (FIG. 1) consults the transmit table 24 (FIG. 1) on the sending node 12 (FIG. 1) for message version information and examines the message translation vector field. The transmit table translation vector entries (each having a particular translation scheme) for the receiving node are examined to determine which appropriate translation should be sent.

The translation vector(s) are attached as attachments to the message (including header information if applicable) to generate a packet (step 92). The packet is sent to the receiving node (step 94). The message module 20, FIG. 1 in the sending node 12, FIG. 1 updates the first time send field to reflect that the translation vector has been sent, and the packet is received by the receiving node (step 96). The receiving node then makes a determination of whether message translation is required for the received message (step 97). If message translation is not required, the method moves to step 108, where the message is forwarded to the application program. If message translation is required, the method then moves to analyze the received translation vector to determine if the vector is compatible. If the translation vector received is compatible (step 98), the message is translated by the message module in the receiving node between versions according to the translation vector (step 100). If the translation vector received is noncompatible (or nonexistent for this node) (again, step 98), the receiving node requests a compatible translation vector (step 102), and the method returns to step 92 where the sending node resends the appropriate translation vector to the receiving node.

Once the message is translated, the receiving node updates the first time receive field in the receive table to reflect that the translation vector has been received (step 104). The receiving node 14 (FIG. 1) stores the translation vector on the receiving table (or elsewhere) (step 106). The translated message is forwarded to the application program (step 108). The method 82 then ends (step 116).

Returning to step 88, if the message is not determined to be sent for the first time, the message module 20 (FIG. 1) in the sending node 12 (FIG. 1) need not send a translation vector. As a result, the message is sent to the receiving node 14 (FIG. 1) without the additional headroom of the translation vector (step 110), and the message is received by the receiving node 14 (FIG. 1) (step 112). The receiving node then determines whether message translation is required for the received message (step 113). If message translation is not required, the method then moves to forward the message to the application program (again, step 108). If message translation is required, the message module 30 (FIG. 1) on the receiving node attempts to retrieve the translation vector 38 (FIG. 1) from its receive table 36 (FIG. 1) (step 114). If the method retrieves a valid translation vector from its receive table, the message is translated between versions according to the translation vector (step 115). Here again, once the message is translated, the translated message is forwarded to the application program 32 (FIG. 1) (again, step 108). The method 82 then ends (again, step 116). Returning back to step 114, if the method is unable to retrieve a valid translation from its receive table 36, FIG. 1, the receiving node requests a compatible translation vector (102), and the method returns to step 92 where the sending node resends the appropriate translation vector the receiving node.

Figure 12:
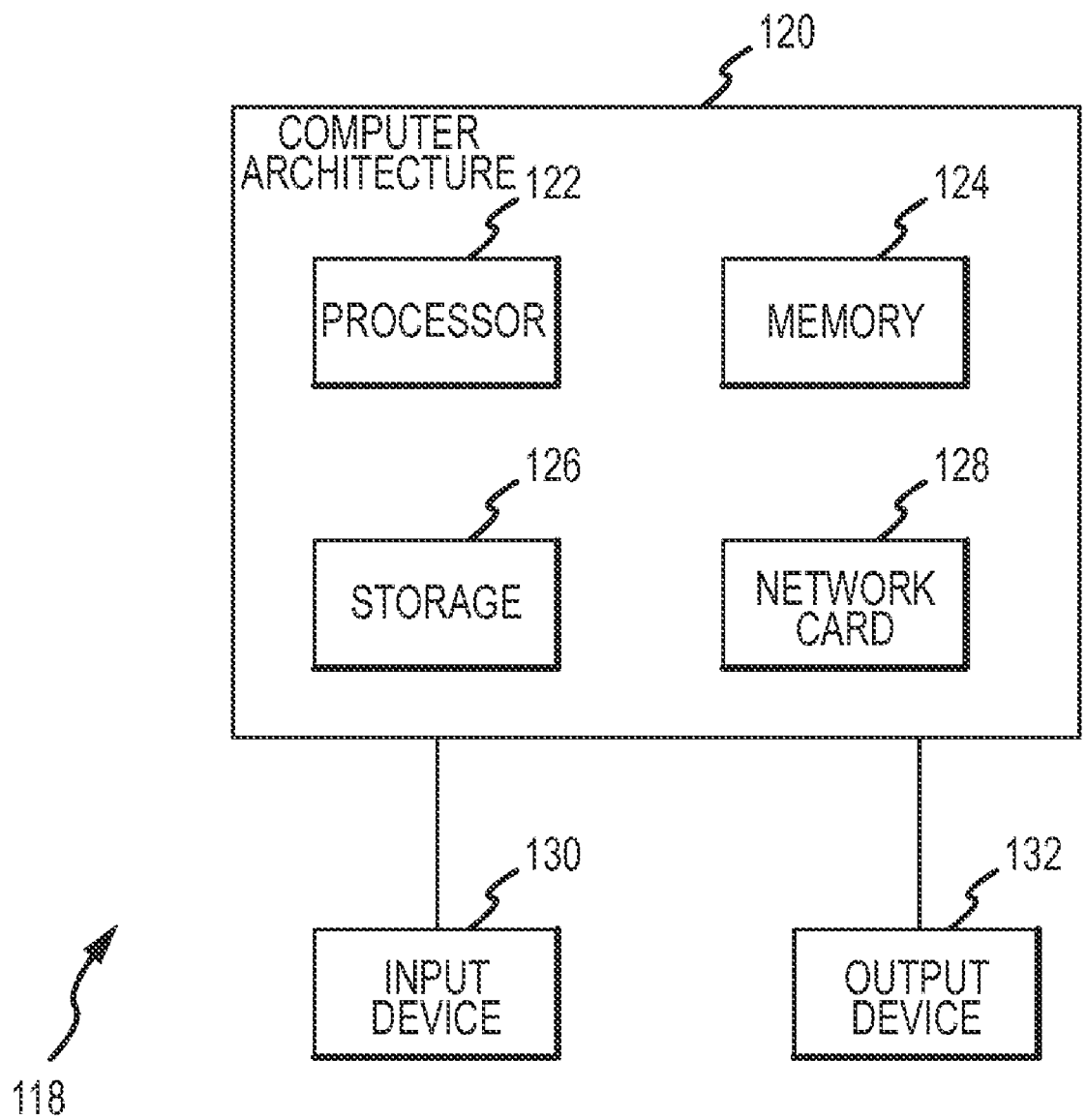
FIG. 12 illustrates exemplary computing environment architecture.

FIG. 12 illustrates an embodiment 118 of a computing system architecture 120 that may be implemented, in whole or in part, in the nodes 14, 16, and 18 of FIG. 1. The architecture 120 may include one or more processors 122 (e.g., a microprocessor), a memory 124 (e.g., a volatile memory device), and storage 126 (e.g., a non-volatile storage such as magnetic disk drives, optical disk drives, a tape drive, etc.). The storage 126 may comprise an internal storage device or an attached or network accessible storage. Programs in the storage 126 are loaded into the memory 124 and executed by the processor(s) 122 in a manner known in the art. The architecture 120 further includes one or more adapters 128 to enable communication over a network. An input device 130 may be used to provide user input to the processor 122, and may include a keyboard, mouse, pen-stylus, microphone, touch sensitive display screen, or any other activation or input mechanism known in the art. An output device 132 is capable of rendering information transmitted from the processor 122, or other component, such as a display monitor, printer, storage, etc.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for message version management in a distributed computing environment including a plurality of nodes, comprising:
   receiving at least one translation vector by a processor in at least one additional node of the plurality of nodes from a first node, the at least one translation vector providing information for the at least one additional node to translate between multiple message versions;
   translating a message between versions according to the at least one translation vector to generate a translated message; and
   forwarding the translated message to an application program.

2. The method of claim 1, further including storing the at least one translation vector on the at least one additional node for future use.

3. The method of claim 2, wherein receiving the at least one translation vector includes receiving a packet including the at least one translation vector attached to a message.

4. The method of claim 3, wherein updating a field includes updating a first time receipt field to reflect a first time receipt of the at least one translation vector.

5. The method of claim 2, further including, subsequent to storing the at least one translation vector on the at least one additional node, updating a field to reflect a receipt of the at least one translation vector.

6. The method of claim 2, further including subsequent to storing the at least one translation vector on the at least one additional node:
   receiving an additional message from the first node,
   retrieving the at least one translation vector, and
   translating the additional message according to the at least one translation vector.

7. The method of claim 1, further including requesting a compatible translation vector from one of the plurality of nodes.

8. The method of claim 1, wherein translating the message between versions according to the at least one translation vector includes modifying the message.

9. The method of claim 8, wherein modifying the message includes one of truncating, deleting, adding, moving, and concatenating the message.

10. An administrator device for message version management in a distributed computing environment including a plurality of nodes, comprising:
    a message module operable on a receiving application in communication with the plurality of nodes, wherein the message module is adapted for:
    receiving at least one translation vector by a processor in at least one additional node of the plurality of nodes from a first node, the at least one translation vector providing information for the at least one additional node to translate between multiple message versions, translating a message between versions according to the at least one translation vector to generate a translated message, and forwarding the translated message to an application program.

11. The device of claim 10, wherein the message module is further adapted for storing the at least one translation vector on the at least one additional node for future use.

12. The device of claim 11, wherein the message module is further adapted for, subsequent to storing the at least one translation vector, updating a field to reflect a receipt of the at least one translation vector.

13. The device of claim 11, wherein the message module is further adapted for requesting a compatible translation vector from the first node.

14. The device of claim 11, wherein the message module is further adapted for, subsequent to storing the at least one translation vector:

receiving an additional message from the first node, retrieving the at least one translation vector, and translating the additional message according to the at least one translation vector.

15. The device of claim 10, wherein the message module is further adapted for modifying the message to translate the message between versions according to the translation vector.

16. The device of claim 15, wherein the message module is further adapted for one of truncating, deleting, adding, moving, and concatenating the message to modify the message.

17. A non-transitory computer program product for message version management in a distributed computing environment including a plurality of nodes, the computer program product comprising a computer-readable storage medium having computer-readable program code portions stored therein, the computer-readable program code portions comprising:

a first executable portion for receiving an at least one translation vector by a processor in at least one additional node of the plurality of nodes from a first node, the at least one translation vector providing information for the at least one additional node to translate between multiple message versions;

a second executable portion for translating a message between versions according to the at least one translation vector to generate a translated message; and a third executable portion for forwarding the translated message to an application program.

18. The computer program product of claim 17, further including a fourth executable portion for storing the at least one translation vector on the at least one additional node for future use.

19. The computer program product of claim 17, wherein the fourth executable portion for storing the at least one translation vector on the at least one additional node includes a fifth executable portion for storing the at least one translation vector on a storage area including one of a message table, array, database, volatile memory, nonvolatile memory, and link list.

20. The computer program product of claim 17, further including a fifth executable portion for, subsequent to storing the at least one translation vector on the at least one additional node:

receiving an additional message from the first node, retrieving the at least one translation vector, and translating the additional message according to the at least one translation vector.

* * * * *